(12) United States Patent
Torii

(10) Patent No.: US 7,066,522 B2
(45) Date of Patent: Jun. 27, 2006

(54) VEHICLE SUN VISOR

(75) Inventor: Hidekazu Torii, Toyota (JP)

(73) Assignees: Kyowa Sangyo Co., Ltd., Aichi-Ken (JP); Shinwa Seiko Co., Ltd., Aichi-Ken (JP)

( * ) Notice: Subject to any disclaimer, the term of this patent is extended or adjusted under 35 U.S.C. 154(b) by 0 days.

(21) Appl. No.: 10/519,643

(22) PCT Filed: Jun. 24, 2003

(86) PCT No.: PCT/JP03/08011

§ 371 (c)(1),
(2), (4) Date: Dec. 22, 2004

(87) PCT Pub. No.: WO2004/002765

PCT Pub. Date: Jan. 8, 2004

(65) Prior Publication Data

US 2005/0206187 A1  Sep. 22, 2005

(30) Foreign Application Priority Data

Jun. 26, 2002  (JP) .............................. 2002-186770

(51) Int. Cl.
*E60J 3/02* (2006.01)
(52) U.S. Cl. ................... 296/97.9; 296/97.12
(58) Field of Classification Search ............... 296/97.1, 296/97.9, 97.12, 97.13
See application file for complete search history.

(56) References Cited

U.S. PATENT DOCUMENTS 5,280,988 A * 1/1994 Gute .................... 296/97.9

FOREIGN PATENT DOCUMENTS

| JP | 09-142143 | 3/1997 |
| JP | 10-129255 | 5/1998 |
| JP | 2001-260650 | 9/2001 |

OTHER PUBLICATIONS

Abstract for JP-0914213 cited by applicant.*

* cited by examiner

*Primary Examiner*—Jason Morrow
(74) *Attorney, Agent, or Firm*—Conley Rose, P.C.

(57) ABSTRACT

A sun visor for vehicles has a sun visor body, a spindle, and a bearing member. The sun visor body is rotatably mounted on a periphery of the spindle via the bearing member. The bearing member has a bearing, for rotatably holding the spindle, and a baffle, for holding the sun visor body at a desired rotational position about the spindle. The bearing member is integrally formed using metal. When at least a predetermined extraction force acts on the spindle relative to the sun visor body, the bearing member is extracted along with the spindle from a receiving part provided on the sun visor body.

11 Claims, 7 Drawing Sheets

VEHICLE SUN VISOR

TECHNICAL FIELD

The present invention relates to a sun visor for vehicles having a sun visor body mounted on the periphery of a spindle via a bearing member.

BACKGROUND ART

Conventionally, a sun visor for vehicles 101, as shown in FIG. 9, is placed in a vehicle interior for the purposes of shading and the like.

The sun visor for vehicles 101, as shown in FIG. 9, includes a sun visor body 102 for use as a light shading body, an approximately L-shaped spindle 103 connecting between the sun visor body 102 and the headlining of a vehicle interior, and a metallic bearing member 104 for rotatably holding the spindle 103 inserted into the sun visor body 102.

The bearing member 104 is arranged in an embedded manner in the sun visor body 102. The sun visor body 102 comprises synthetic resin foam coated with a covering material. In addition, the bearing member 104 is connected to both ends of a wire frame 106. The wire frame 106 is used for reinforcement and is arranged in an embedded manner along the periphery of the sun visor body 102. As a result, the shape of the sun visor body 102 is kept relatively constant. In addition, the sun visor body 102 is rotatably mounted on an end of the spindle 103 via the bearing member 104.

In the conventional sun visor for vehicles 101, when the tip of the spindle 103 is extracted from the bearing member 104, the metallic bearing member 104 is left within the sun visor body 102. A problem resulting from the extraction of the spindle 103 is that the bearing member 104 remains embedded in the sun visor body 102. In addition, the bearing member 104 is connected to the annular wire frame 106. Consequently, it is extremely difficult to separate the bearing member 104 and recover the bearing member 104 from the sun visor body 102.

Recently, there has been a great demand for product designs where the fractional recovery of products is possible after the disposal of the products. In addition, there is a demand for the ability to easily reuse and recycle old and obsolete products. In such circumstances, there has been a problem that the bearing member 104, most of which is produced using metal, and the sun visor body 102, most of which is produced using a nonmetal such as a synthetic resin, can not be easily separated from each other and recovered for reuse. This problem may be an obstacle in the promotion of recycling, such as the re-commercialization of the sun visor body 102. In addition, the lack of an ability to separate the materials is not preferable with respect to a goal of preserving the environment.

DISCLOSURE OF THE INVENTION

The invention of this application, which was made in consideration of such problems, is focused on providing a sun visor for vehicles where the bearing member is easily separated and recovered apart from the sun visor body.

To solve these problems and others, the invention of this application is a sun visor for vehicles having a sun visor body mounted on the periphery of a spindle via a bearing member. The sun visor is configured so as to include a bearing member that has a bearing portion rotatably holding the spindle and a baffle portion holding the sun visor body at a desired, rotated position with respect to the spindle. The bearing member may be formed using a metal material. The bearing member may frictionally hold the spindle. The bearing member and the spindle may be received in a receiving part provided within the sun visor body. The bearing member may be extracted from the receiving part along with the spindle when at least a predetermined extraction force acts on the spindle relative to the sun visor body. Therefore, the bearing member can be recovered from inside of the sun visor body by only extracting the spindle. When the sun visor body primarily comprises a nonmetal material such as synthetic resin, there is an advantage with the current invention such that it is relatively easy to separate and recover the nonmetallic sun visor body from the metallic bearing member.

Furthermore, the invention of the application can be configured as a sun visor for vehicles characterized such that the bearing and the baffle are integrally formed together. The term "integrally" mentioned here implies that the bearing and the baffle are not physically separated from each other. For example, the bearing and the baffle may be integrally formed using a single piece of metal material such as iron or spring steel sheet. Accordingly, punching and bending the iron sheet can easily produce the bearing member for example. In addition, there is an advantage that the bearing member is not separated into a plurality of parts. Consequently, the bearing member is easily recovered from the interior of the sun visor body.

Furthermore, the invention of the application can be configured as a sun visor for vehicles characterized in that the bearing member is integrally provided with a friction adding part. The friction adding part may be constructed using a metal material that elastically contacts the periphery of the spindle and adds frictional resistance to the rotation of the sun visor body about the spindle. Therefore, there is an advantage that when the sun visor body is operated so as to rotate on the periphery of the spindle, an appropriate level of adjusting feeling is obtained due to the frictional resistance between the spindle and the friction adding part. Consequently, it is relatively easy to operate the sun visor body to a desired angular position. In addition, there is an advantage that the bearing member is easily produced since the friction adding part is provided integrally along with the bearing member, using metal materials. The bearing member is also easily recovered from the interior of the sun visor body.

Furthermore, the invention of the application can be configured as a sun visor for vehicles in a configuration where the bearing member is integrally provided with a retaining part. The retaining part may be made using a metal material and may elastically engage with an engaging depression or engaging hole provided on an inside surface of the receiving part. Once engaged, the retaining part may function so as to block the member from being inadvertently removed from the receiving part. The retaining part may be disengaged from the engaging depression or engaging hole when a predetermined extraction force or more acts on the spindle relative to the sun visor body. Here, the described "engaging depression or engaging hole" implies that the part engaged by the retaining part may be an "engaging depression," such as a concavely formed recess or cavity on an inside surface of the receiving part, or an "engaging hole," such that a hole is formed so as to penetrate from an inside surface of the receiving part to an exterior surface of the receiving part. According to such a configuration, the bearing member can be securely received in the receiving part located within the sun visor body without unintentional separation. The secured connection is due to the engaging force exerted between the retaining part and the engaging depression or engaging hole while the retaining part is engaged. Conversely, when the retaining part is disengaged from the engaging depression or engaging hole, the bearing member can be easily extracted from the receiving part along with the spindle. In addition, since the retaining part is integrally provided with the bearing member, for example using a metal material, there are advantages that the bearing member is easily produced, and the bearing member is easily recovered from the interior of the sun visor body.

Furthermore, the invention of the application can be configured as a sun visor for vehicles characterized in that the sun visor body is molded using a thermoplastic synthetic resin. Therefore, there are advantages that the sun visor body, made of a thermoplastic synthetic resin, and the bearing member, made of metal, can be separated from each other and recovered. Recycling of the materials is readily performed after the sun visor body and the bearing member are separated and recovered. For example, the material of the recovered sun visor body may be used as a material for other synthetic resin products.

BEST MODE FOR CARRYING OUT THE INVENTION

Figure 1:
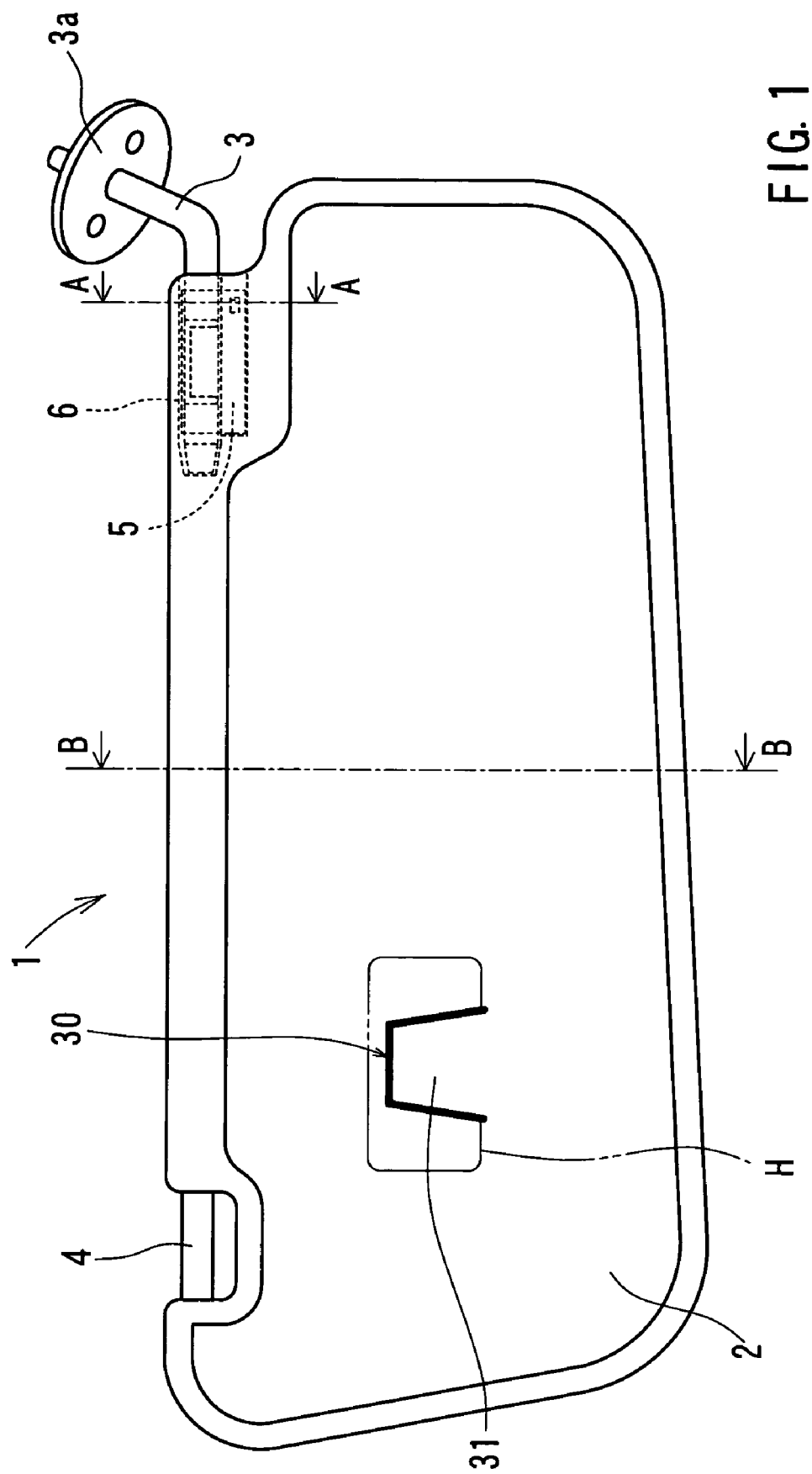
FIG. 1 is a front view showing an embodiment of a sun visor for vehicles.
Figure 2:
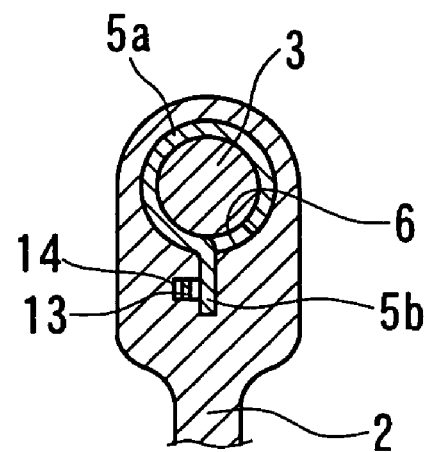
FIG. 2 is a cross-sectional view of a portion of the sun visor for vehicles taken along the line A—A in FIG. 1.

FIG. 1 is a front view showing an embodiment of a sun visor for vehicles 1. FIG. 2 is a cross-sectional view of the sun visor for vehicles 1 taken along the line A—A. And further, FIG. 3 is a cross-sectional view of the sun visor for vehicles 1 taken along the line B—B.

(Sun Visor Body)

Figure 3:
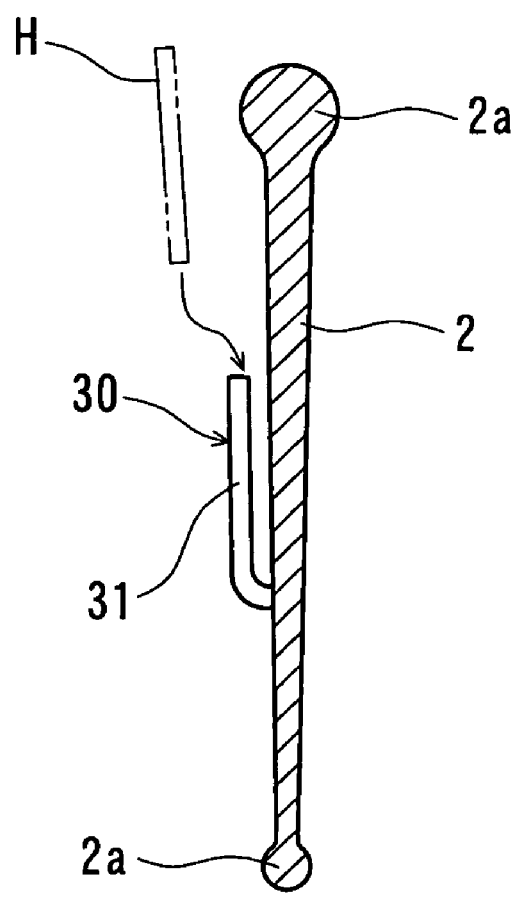
FIG. 3 is a cross-sectional view of the sun visor for vehicles taken along the line B—B in FIG. 1.

As shown in FIG. 1 and FIG. 3, in this embodiment the sun visor for vehicles 1 comprises a sun visor body 2. A function of the sun visor body 2 is to shade sunlight and the like from otherwise shining into the vehicle interior. In this embodiment, the sun visor body 2 is integrally molded in an approximately rectangular sheet pattern via injection molding of a thermoplastic synthetic resin. As shown in FIG. 3, the central portion of the sun visor body 2 is molded in a flat plate shaped manner. The outer circumference of the sun visor body 2 is fringed with an outer frame 2a having an approximately circular cross-sectional shape. The sun visor body 2 can be produced using other molding methods such as bead foaming, injection blow molding, and the like.

As shown in FIG. 1 and FIG. 3, the sun visor body 2 has a cardholder 30 in which various cards H can be held, such as credit cards and prepaid cards. The cardholder 30 has a holding strip 31 formed so as to protrude from a surface of the sun visor body 2. The cards H can be inserted from above or from the side and held between the holding strip 31 and the surface of the sun visor body 2.

As shown in FIG. 1, the sun visor body 2 is attached on a headlining surface of the vehicle interior via a spindle 3. The spindle 3 is a rod shaped member molded in approximately an L shape.

One end of the spindle 3 is rotatably fixed to a desired point of the headlining surface of the vehicle interior via a mounting bracket 3a. Conversely, as shown in FIG. 2, the other end of the spindle 3 is inserted and rotatably fitted into a bearing 5a of the bearing member 5. The bearing member 5 is fixed within and relative to the sun visor body 2. Accordingly, the spindle 3 supports the sun visor body 2 approximately horizontally. The orientation of the sun visor body 2 is typically switched between a storage position, located along the headlining surface of the vehicle interior, and a shading position, located along the front glass of the vehicle. The sun visor body 2 is switched in orientation by rotating on the end of the spindle 3 about the spindle 3 axis.

Furthermore, as shown in FIG. 1, a support shaft 4 is provided at a top end of a left end side of the sun visor body 2. The support shaft 4 is rotatably retained on a not-shown corresponding retaining hook placed within the vehicle interior. Accordingly, the sun visor body 2 is supported rotatably and approximately horizontally on the periphery of the spindle 3.

As shown in FIG. 1, a receiving part 6 configured in a concave pattern for receiving the bearing member 5 is inwardly provided within the sun visor body 2. The receiving part 6 has an approximately keyhole shaped section corresponding to the profile of the bearing member 5, as shown in FIG. 2. The bearing member 5 is inserted into an opening 15 (see FIG. 7) that opens to the outside of the receiving portion 6. Thereby, the bearing member 5 is pressed within the receiving part 6.

(Spindle and Bearing Member)

Figure 4:
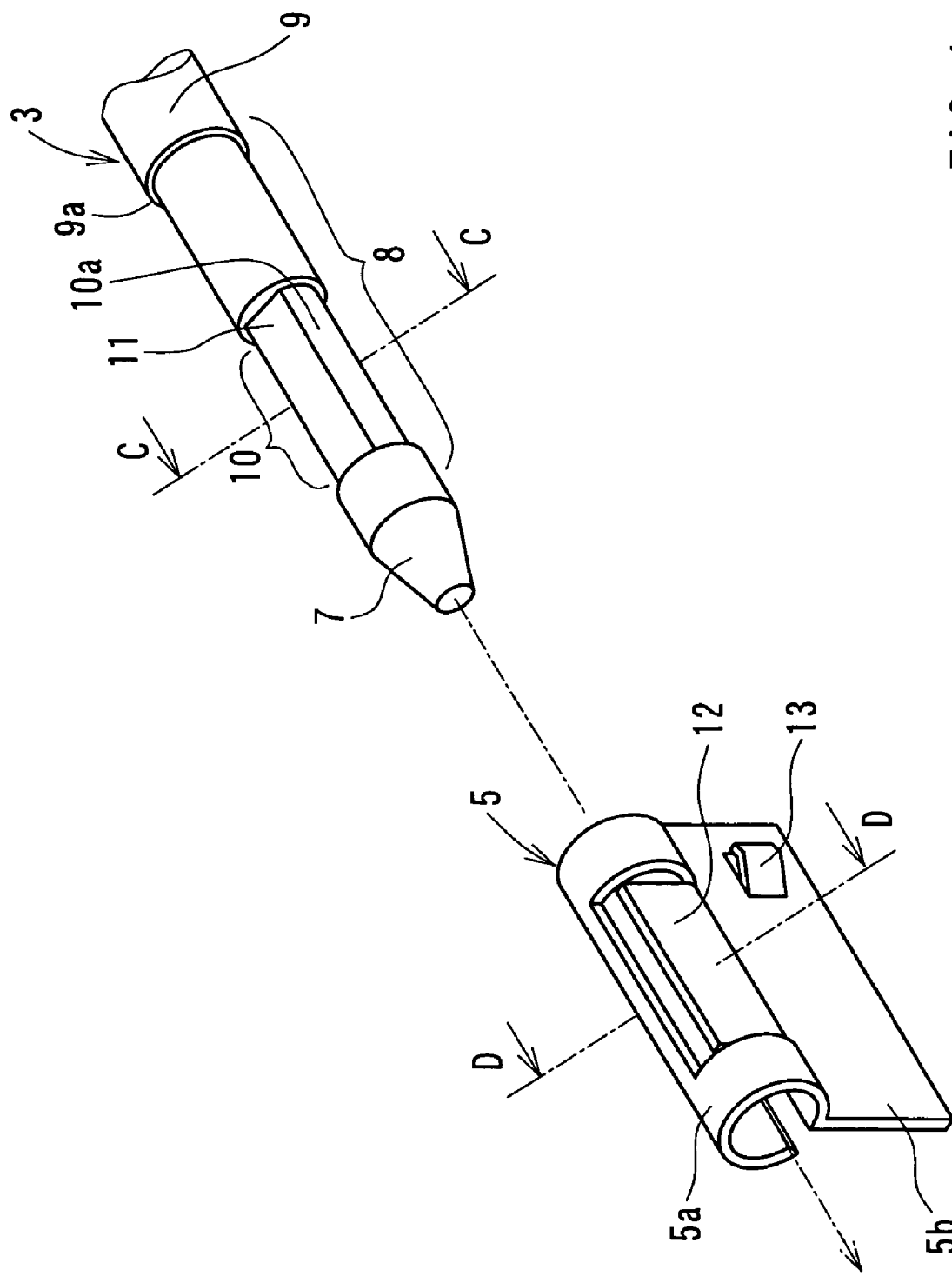
FIG. 4 is a perspective view showing a condition prior to assembling the spindle to the bearing member.
Figure 5:
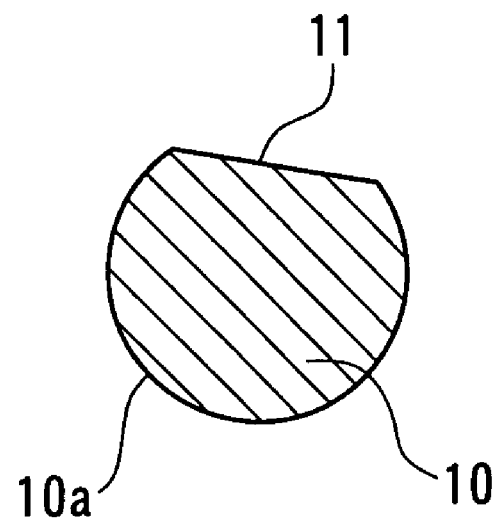
FIG. 5 is a cross-sectional view of the spindle taken along the line C—C in FIG. 4.
Figure 6:
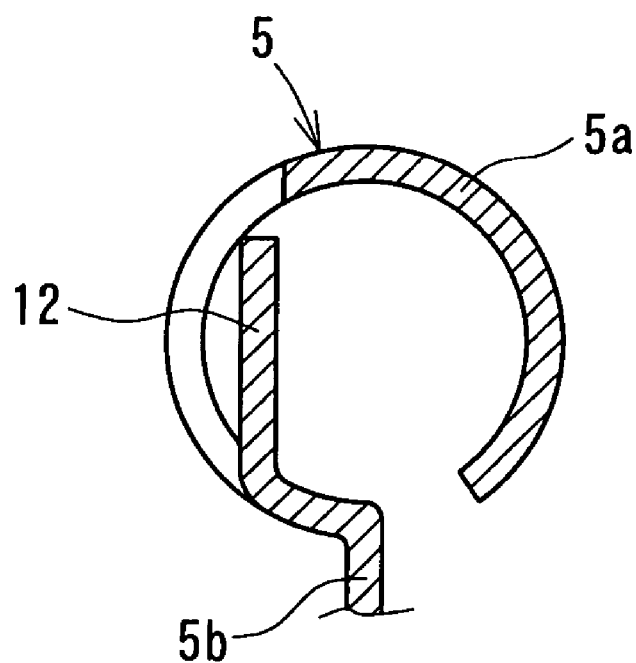
FIG. 6 is a cross-sectional view of the bearing member taken along the line D—D in FIG. 4.

FIG. 4 is a perspective view showing the condition prior to assembling the spindle 3 to the bearing member 5. FIG. 5 is a cross-sectional view of the spindle 3 taken along the line C—C in FIG. 4. FIG. 6 is a cross-sectional view of the bearing member 5 taken along the line D—D in FIG. 4.

As shown in FIG. 4, the spindle 3 is a rod-like member formed to have an approximately circular cross-section using a rigid, thermoplastic synthetic resin. The spindle 3 comprises essentially two parts of an insertion part 8. Insertion part 8 is subsequently inserted into the bearing 5a of the bearing member 5. The spindle 3 also comprises a rear anchor 9. Rear anchor 9 is a portion located at a rear side (right side in FIG. 4) of the spindle 3, nearer to the mounting bracket 3a than is the insertion part 8. The shaft diameter of the insertion part 8 is formed so as to be smaller than shaft diameter of the rear anchor 9. A step 9a having a height corresponding to the difference between the shaft diameters is formed in the boundary region between the insertion part 8 and the rear anchor 9. A truncated, cone shaped tip 7 is provided at the tip end of the spindle 3. The tip 7 is formed in a tapered pattern in order to facilitate the insertion of the spindle 3 into the bearing 5a. A contact part 10, having a non-circular section, is formed within the insertion part 8 at a position located nearer to the tip 7 than to a central position relative to the axial length of the insertion part 8.

The bearing member 5, as shown in FIG. 4, is preferably formed by cutting and bending a flat plate shaped member comprising a metal material, for example, such materials as iron or spring steels and the like. Bearing member 5 includes the bearing 5a, formed in an approximately cylindrical shape, and a plate shaped baffle 5b, formed by a downward extension of material from a lower end of the bearing 5a. The bearing 5a and the baffle 5b are integrally formed together.

The tip 7 of the spindle 3 is inserted into the bearing 5a such that the tip 7 penetrates from one end opening, to and beyond the other end opening. The bearing member 5 is assembled with an outer circumferential surface of the insertion part 8 slidably contacting an inner circumferential surface of the bearing 5a. The spindle 3 can smoothly rotate relative to the bearing 5a by slidably contacting with the inner circumference face of the bearing. Consequently, the sun visor body 2 can be operated so as to rotate on the periphery of the spindle 3.

A friction adding part 12 is provided at an approximately central position of the bearing 5a in an axial direction. The friction adding part 12 may be formed by cutting or punch forming a wall at an outer circumference side of the bearing 5a into approximately an inverted U shape, leaving one end of a lower end side of the U attached to the bearing member 5 (see FIG. 4). As shown in FIG. 6, the friction adding part 12 is formed with a relatively straight section and is configured so as to be a chord of the approximately circular section of the bearing 5a. The friction adding part 12 is resiliently fitted to the contact part 10, formed in the spindle 3, when the spindle 3 is inserted into an open end of the bearing 5a. Accordingly, the spindle 3 is assembled to the bearing member 5 so as to rotate relative to each other but remain relatively fixed in an axial direction.

As shown in FIG. 4 and FIG. 5, an end face 11 is formed in an outer circumference of the contact part 10. The end face 11 is formed as an approximately flat surface such that a portion of the outer circumference may be represented as straight when a section is taken of the contact part 10.

In the case that the sun visor body 2 is operated so as to rotate on the periphery of the spindle 3, the friction adding part 12 provides at least two functions. The resilient force due to the bending deformation of the friction adding part 12 results in the pressing of the contact part 10 between the inner circumference face of the bearing 5a and the inner face of the friction adding part 12 in the rotation range where the friction adding part 12 is in contact with a circular portion 10a, other than the end face 11 of the contact part 10. An appropriate frictional resistance is generated between the contact of the outer circumference face of the contact part 10 and both the inner circumference face of the bearing 5a and the inner face of the friction adding part 12. Therefore an advantage exists in that the adjusting feeling is improved when the sun visor body 2 is operated to rotate. In addition, the sun visor body 2 may be placed in a desired rotational orientation and remain stationary in this position due to the generated frictional forces.

In a rotation range where the contact point of the friction adding part 12 to the contact part 10 is shifted from the circular portion 10a to the end face 11, the friction adding part 12 is resiliently returned from a bending deformation condition toward a more straight condition. A biasing force is generated causing the rotation of the sun visor body 2 on the periphery of the spindle 3. This biasing force is generated between the friction adding part 12 and the spindle 3. As a result, the sun visor body 2 can be biased to automatically spring into a storage position, for example, against the headlining of the vehicle interior. Therefore there is an advantage that the storage operation of the sun visor body 2 is relatively easy.

As shown in FIG. 4, the baffle 5b of the bearing member 5 has a retaining part 13. The retaining part 13 is formed such that a portion of the baffle 5b is cut or punched into an approximately U shape. An inner region of the approximately U shape is drawn and raised. The retaining part 13 is provided at a position corresponding to an engaging depression 14 formed on the inside of the receiving part 6 of the sun visor body 2. In addition, an engaging depression or hole may be formed on the bearing member 5 and the retaining part may be formed on an interior surface of the receiving part 6.

Figure 7:
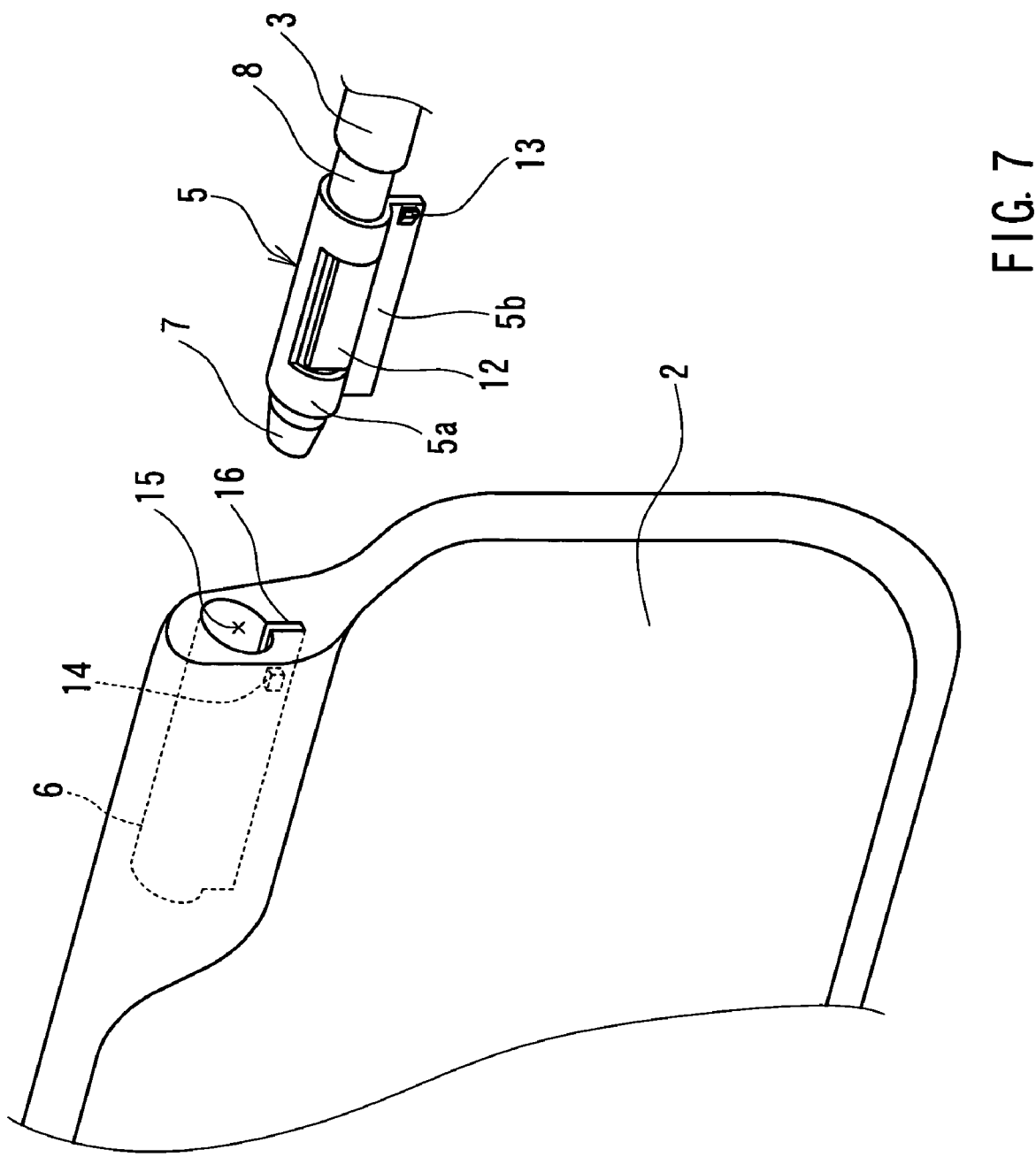
FIG. 7 is a perspective view showing the condition when the bearing member, previously assembled to the spindle, is directed to the receiving part of the sun visor body for a press fit.

FIG. 7 is a perspective view showing a condition where the bearing member 5 is assembled to the spindle 3. The assembly is directed to the receiving part 6 of the sun visor body 2 for insertion within the receiving part 6.

As shown in FIG. 7, a vertical groove 16 is provided at a lower end of the receiving part 6, and extends along a longitudinal direction of the receiving part 6. The opening 15 in the receiving part 6 is in a keyhole pattern. The baffle 5b, provided at the lower end of the bearing 5a, is forced inwardly and fitted to the vertical groove 16 when the bearing member 5 is inserted into the opening 15 within the receiving part 6. During insertion, the retaining part 13 is compressed by the sidewalls of the vertical groove 16 and deformed so as to be relatively flush with the remaining surfaces of the baffle 5b (the retaining part 13 is deformed at least enough to allow slidable insertion into the vertical groove 16).

The retaining part 13 resiliently clicks (i.e. is restored toward the original configuration of the retaining part 13) and engages with a concave engaging depression 14 provided on the sidewall of the vertical groove 16. The engaging action occurs when the bearing member 5 is pushed a predetermined distance (i.e., depth) into the receiving part 6 (see FIG. 2). Then, displacement in the axial direction of the bearing member 5, received within the receiving part 6, is prevented due to the engaging force between the retaining part 13 and the engaging depression 14. Consequently, the bearing member 5 is prevented from falling off (i.e., inadvertent removal) from the receiving part 6.

In addition, the baffle 5b is fitted into the vertical groove 16, by which the bearing member 5 is rotatably fixed relative to the receiving part 6. However, the bearing member 5 may still rotate relative to the spindle 3. Subsequently, the sun visor body 2 may also rotate relative to the spindle 3 via the bearing member 5. In addition, the sun visor body 2, mounted on the periphery of the spindle 3 via the bearing member 5, is held by the baffle 5b at a desired rotational position with respect to the spindle 3.

[Operation]

In the sun visor for vehicles 1 configured as above, the retaining part 13 is disengaged from the engaging depression 14 when a predetermined extraction force or more acts upon the spindle 3 relative to the sun visor body 2. Accordingly, the bearing member 5 can be separated and recovered from the inside of the sun visor body 2 since the bearing member 5 can be extracted from the receiving part 6 along with the spindle 3. After the bearing member 5 has been separated and recovered from the inside of the sun visor body 2, each of the separated members can be recycled, for example, through re-commercialization.

To illustrate, after the synthetic resin sun visor body 2 has been recovered, recycling is possible via the re-commercialization of the synthetic resin material as other synthetic resin products and the like. After the metal bearing member 5 has been recovered, recycling is possible via the re-commercialization of the metal material as other metallic products and the like. In addition, the metal bearing member 5 may potentially be reused as a bearing member for other sun visors for vehicles.

As further embodiments of the invention, at least the following variations may be also considered.

The sun visor body 2 in the above embodiment is integrally formed as a single component in a sheet pattern using injection molding of a thermoplastic synthetic resin material. However, the invention can be embodied with a sun visor body 20 formed in two pieces having a bi-partition structure. The bi-partition structure may include a top 20a and a back 20b as shown in FIG. 8.

Figure 8:
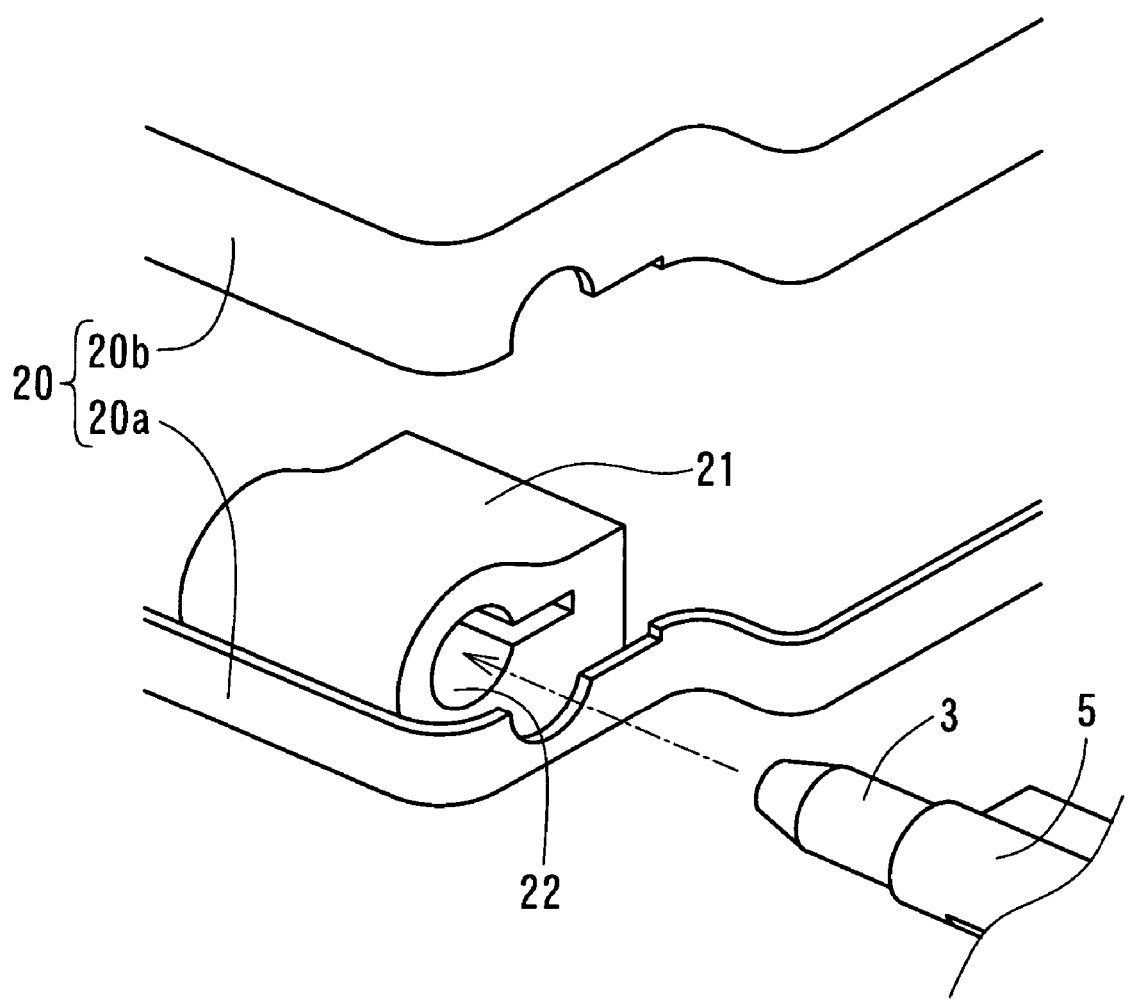
FIG. 8 is a perspective view showing a modification of the sun visor body.
Figure 9:
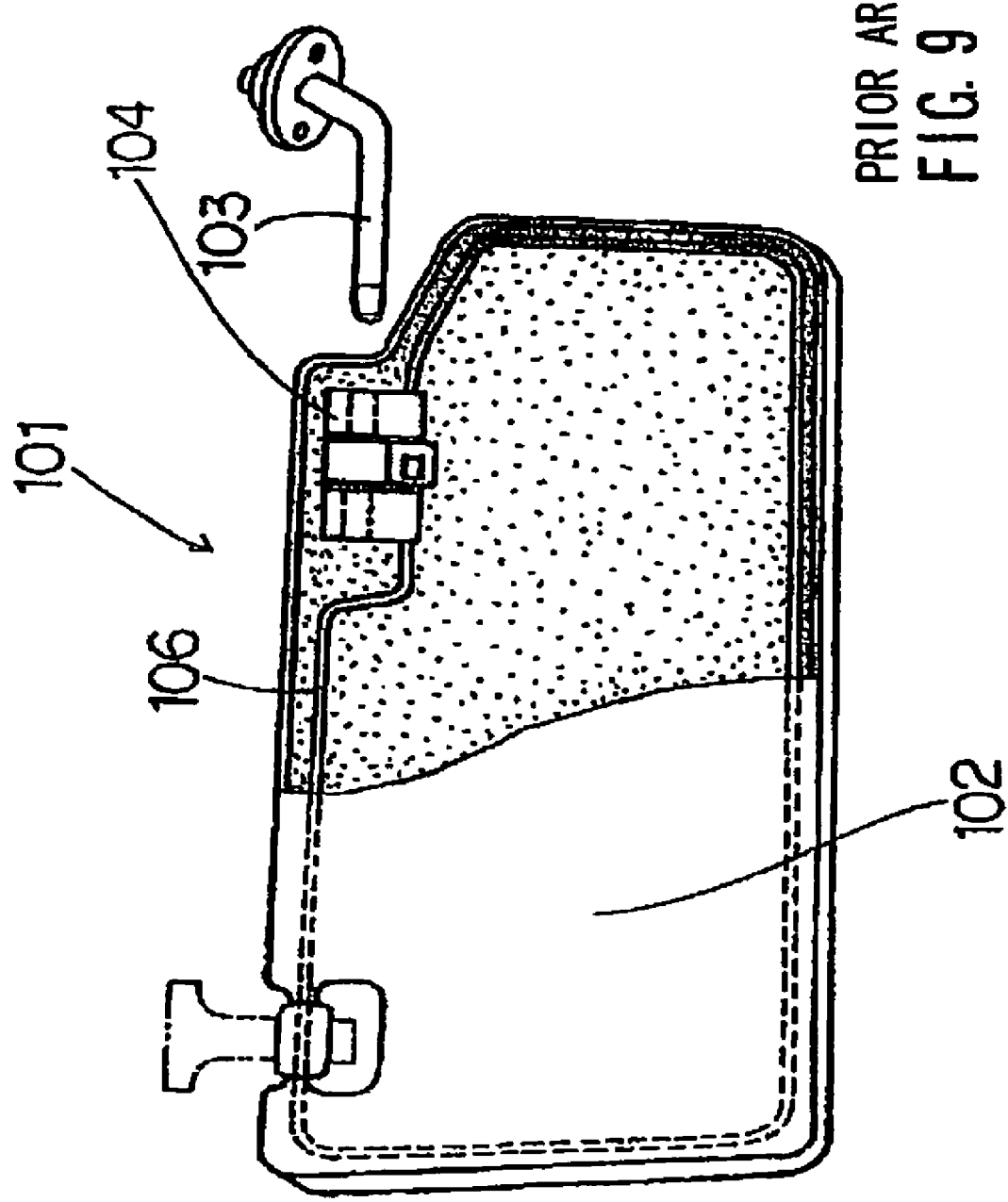
FIG. 9 is a front view showing a conventional sun visor for vehicles.

The sun visor body 20 as shown in FIG. 8 is formed with a hollow inner structure by joining the top 20a to the back 20b. The top 20a and the back 20b may be molded in a dish shape using an injection molding process of the thermoplastic synthetic resin. Preferably, a case member 21, formed in a block configuration, is integrally provided on an inside surface of the top 20a using injection molding of the thermoplastic synthetic resin. A receiving part 22 is concavely provided on the inside of the case member 21. The receiving part 22 has a keyhole section corresponding to the profile of the bearing member 5. The bearing member 5 is pressed and received into the receiving part 22, having been previously mounted on the periphery of the spindle 3. The bearing member 5 is extracted from the receiving part 22 along with the spindle 3 when at least a predetermined force acts on the spindle 3 relative to the sun visor body 20. The sun visor body 20 and the bearing member 5 are separated from each other and recovered. Consequently, the same operation as in the sun visor for vehicles 1 detailed in the previous embodiment can be achieved even if the sun visor body 20 is formed with a bi-partition structure.

A cardholder 30 provided on a surface of the sun visor body 2 is illustrated in the initial embodiment. However, the invention is not limited to the cardholder 30, and other accessories such as a vanity mirror, map lamp, and the like, can be provided on the surface of the sun visor body 2. A vanity mirror provided on the sun visor body 2 is a convenient accessory because it allows the vehicle occupants to see their reflections in the mirror in order to check their makeup, hair, and the like. A map lamp provided on the sun visor body 2 is also a convenient accessory because the vehicle occupants can read and check a map and the like, for example, even at night in a dark vehicle interior.

In the initial embodiment, the baffle 5b of the bearing member 5 is illustrated as being formed by outwardly extending a flat sheet pattern from the lower end of the bearing 5a. However, the invention is not intended to be limited to such a specific shape or aspect. The baffle 5b can be formed in any other shape or aspect as long as the baffle can disable the rotation of the bearing member 5 relative to the receiving part 6.

The material of the bearing member 5 in the initial embodiment is illustrated as spring steel. However, the invention can be configured with a bearing member 5 comprising any other metal material such as iron, stainless steel, or copper alloy materials.

The sun visor body 2 is produced using injection molding of a thermoplastic synthetic resin material as illustrated in the initial embodiment. However, in addition to this the invention can be configured with sun visor bodies produced in many other various methods. For example, the invention can be configured for a sun visor body produced by blow molding thermoplastic synthetic resin, bead foaming, and the like. Furthermore, materials of the sun visor body are not to be limited to thermoplastic synthetic resin materials. The invention can be incorporated into the sun visor for a vehicle even if the sun visor body comprises other materials such as rubber, wood, and corrugated fiberboard.

The outer surface of the sun visor body 2 is not coated with a covering or skin material in the initial embodiment. However, the invention can be configured with the outer surface of the sun visor body coated with a covering material or skin material formed from a polyvinyl chloride, a non-woven fabric, and the like. In addition, the invention can be configured with decoration such as cresting applied to a resin surface of the sun visor body.

The sun visor for vehicles 1 is illustrated as being disposed along the front glass in the initial embodiment. However, the invention can additionally be configured as a sun visor for vehicles that is arranged either solely along side glass, or is capable of being arranged along the side glass in addition to the front glass. Consequently, the sun visor can shade the sunlight and the like shining through the side glass.

As described hereinbefore, according to the invention a sun visor can be provided for vehicles in which the bearing member is relatively easily separated from the sun visor body and recovered.

The invention claimed is:

1. A sun visor for vehicles having a sun visor body mounted on a periphery of a spindle via a bearing member, the sun visor comprising:
   the bearing member including;
   a bearing for rotatably holding the spindle, and
   a baffle for holding the sun visor body at a desired rotation position with respect to the spindle;
   a receiving part provided within the sun visor body,
   a resilient retaining part provided with the bearing member,
   an engaging cavity corresponding to the retaining part provided with the receiving part,
   whereby the bearing member is rotatably attached to the spindle,
   whereby the bearing member and spindle assembly is received in the receiving part,
   whereby the retaining part resiliently engages with the corresponding engaging cavity and inhibits the inadvertent removal of the bearing member from the receiving part, and
   whereby the retaining part is disengaged from the engaging cavity upon the application of at least a predetermined extraction force acting on the spindle relative to the sun visor body, allowing the removal of at least the bearing member and spindle assembly from the receiving part of the sun visor body.

2. The sun visor for vehicles according to claim 1 whereby the bearing member is made of a metal material.

3. The sun visor for vehicles according to claim 2 whereby the bearing and the baffle are integrally formed together.

4. The sun visor for vehicles according to claim 3 whereby the bearing member further comprises:
   a friction adding part,
   whereby the friction adding part elastically contacts the periphery of the spindle and adds frictional resistance opposing at least a part of the rotation of the sun visor body about the spindle.

5. The sun visor for vehicles according to claim 4 wherein the friction adding part is made of a metal material.

6. The sun visor for vehicles according to claim 5 wherein the friction adding part is integrally formed with the bearing member.

7. The sun visor for vehicles according to claim 6 wherein the retaining part is made from a metal material.

8. The sun visor for vehicles according to claim 7 wherein the retaining part is integrally formed with the bearing member.

9. The sun visor for vehicles according to claim 8 wherein the bearing, bearing member, and retaining part, are all formed from a single piece of the metal material.

10. The sun visor for vehicles according to claim 9 wherein the sun visor body is molded using a thermoplastic synthetic resin.

11. A sun visor for vehicles having a sun visor body mounted on a periphery of a spindle via a bearing member, the sun visor comprising:
   the bearing member including;
   a bearing for rotatably holding the spindle, and
   a baffle for holding the sun visor body at a desired rotation position with respect to the spindle,
   a resilient retaining part, and
   a friction adding part;
   a receiving part provided within the sun visor body,
   an engaging cavity corresponding to the retaining part and provided with the receiving part,
   whereby the bearing member is rotatably attached to the spindle,
   whereby the bearing member and spindle assembly is received in the receiving part,
   whereby the bearing, the baffle, the retaining part, and the friction adding part, are all integrally formed together from a single piece of metal material,
   whereby the friction adding part elastically contacts the periphery of the spindle and adds frictional resistance opposing at least a part of the rotation of the sun visor body about the spindle,
   whereby the retaining part resiliently engages with the corresponding engaging cavity and inhibits the inadvertent removal of the bearing member from the receiving part, and
   whereby the retaining part is disengaged from the engaging cavity upon the application of at least a predetermined extraction force acting on the spindle relative to the sun visor body, allowing the removal of at least the bearing member and spindle assembly from the receiving part of the sun visor body.

* * * * *